F. C. MILLER.
RIM AND TIRE HOLDER FOR AUTOMOBILES.
APPLICATION FILED JAN. 31, 1913.
1,094,084.
Patented Apr. 21, 1914.
2 SHEETS—SHEET 2.
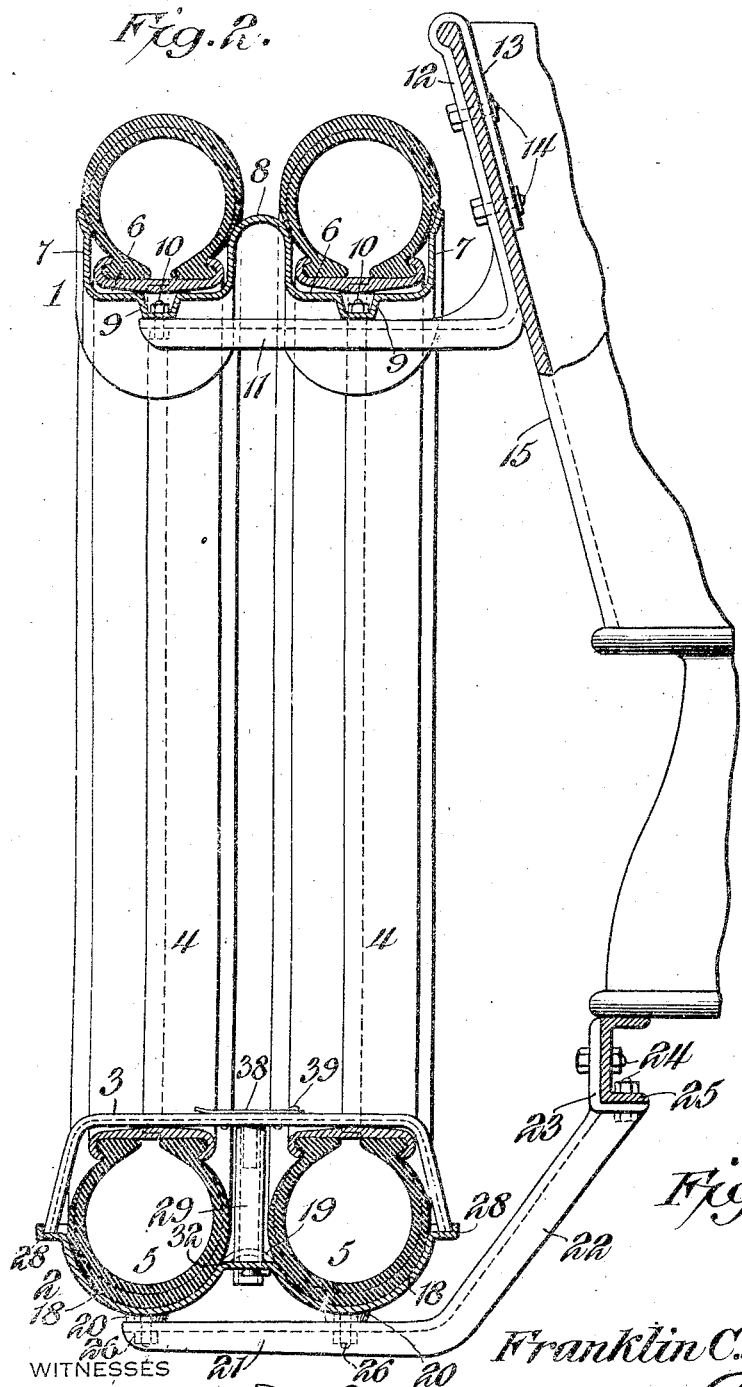
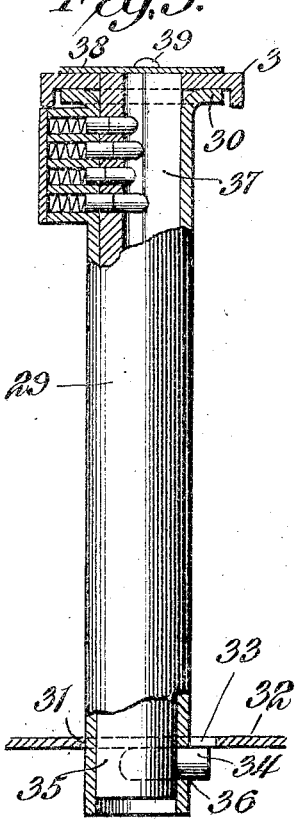
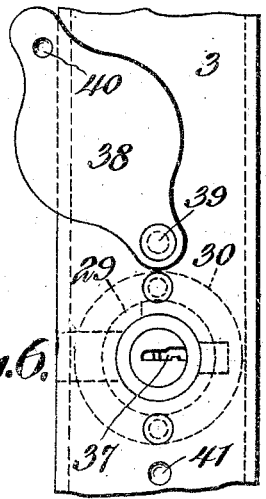
Franklin C. Miller, INVENTOR,
BY
ATTORNEY

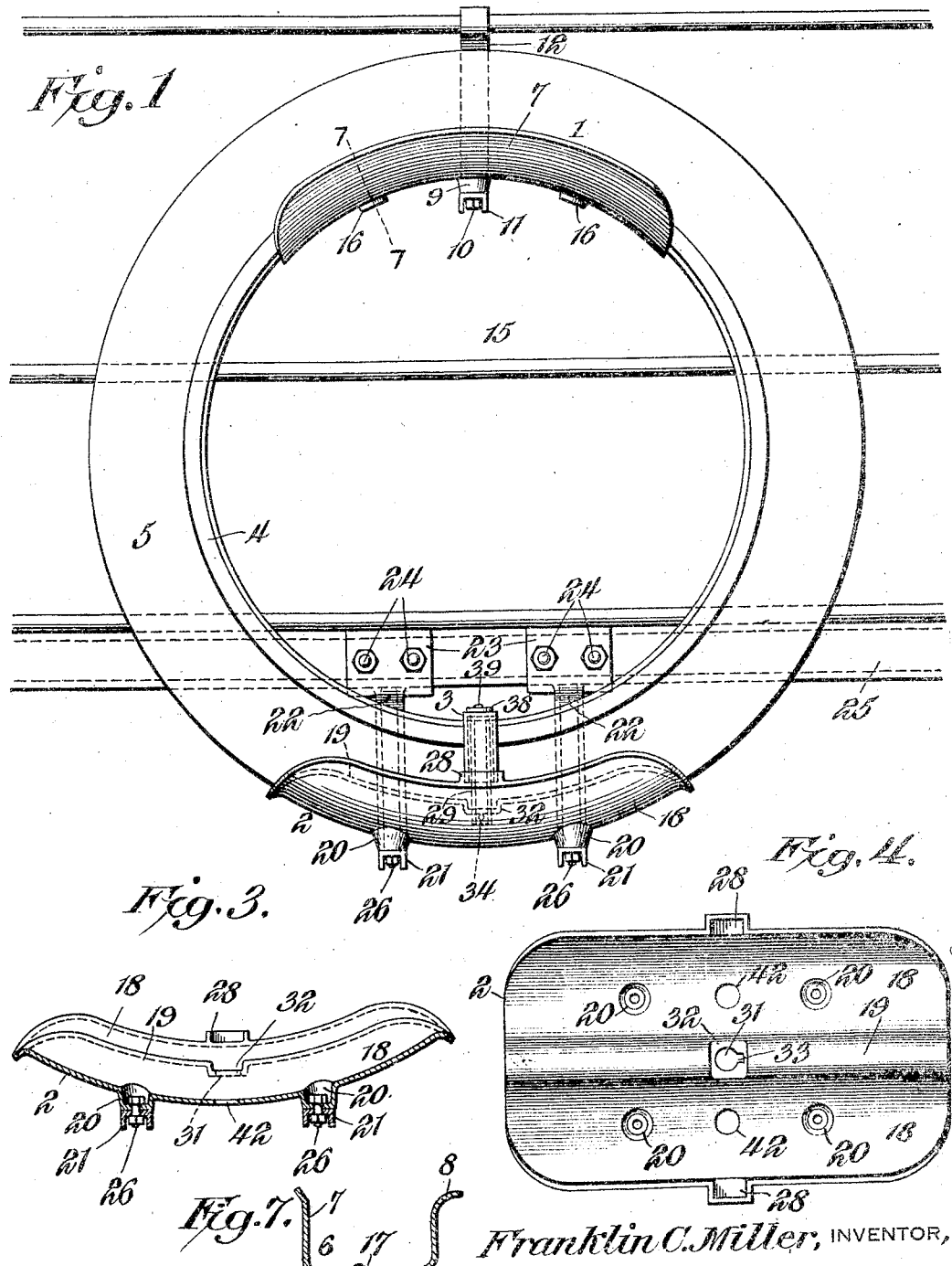

UNITED STATES PATENT OFFICE.

FRANKLIN C. MILLER, OF EASTON, PENNSYLVANIA.

RIM AND TIRE HOLDER FOR AUTOMOBILES.

1,094,084.   Specification of Letters Patent.   Patented Apr. 21, 1914.

Application filed January 31, 1913.  Serial No. 745,457.

*To all whom it may concern:*

Be it known that I, FRANKLIN C. MILLER, a citizen of the United States, residing at Easton, in the county of Northampton and State of Pennsylvania, have invented a new and useful Rim and Tire Holder for Automobiles, of which the following is a specification.

The invention relates to a rim and tire holder for automobiles.

The object of the present invention is to improve the construction of tire holding devices for automobiles, and to provide a simple and inexpensive rim and tire holder of strong and durable construction, designed to receive demountable rims with various forms of tires, and also various kinds of tires without rims, and adapted to be mounted either at the side or rear of an automobile, and capable of supporting and securely fastening a plurality of tires or tired rims without the use of straps or similar fastening devices and of effectually preventing such tires or tired rims from being removed until the device is unlocked by a proper key.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation of a rim and tire holder constructed in accordance with this invention. Fig. 2 is a central vertical sectional view of the same. Fig. 3 is a longitudinal sectional view of the lower support. Fig. 4 is a plan view of the same. Fig. 5 is an enlarged detail view, illustrating the manner of locking the yoke on the lower support. Fig. 6 is a plan view of a portion of the yoke, illustrating the arrangement of the locking mechanism. Fig. 7 is a detail sectional view on the line 7—7 of Fig. 1, illustrating the arrangement of the cushions of the upper support.

Like numerals of reference designate corresponding parts in all the figures of the drawings.

In the accompanying drawings in which is illustrated the preferred embodiment of the invention, the rim and tire holder comprises in its construction upper and lower supports 1 and 2 and a yoke 3 arching the lower support and detachably secured to the same for retaining a pair of demountable rims 4 and tires 5 on the said upper and lower supports. The upper support 1, which is designed to be constructed of pressed steel or other suitable material, is curved longitudinally to present an upper convex face to and conform to the configuration of and form seats for the upper portion of the rims 4, and its terminals are preferably tapered, as shown. The upper support is provided with spaced parallel grooves 6 receiving the upper portions of the rims and the tires and formed by outer marginal flanges 7 and an arched intermediate longitudinal portion 8, which is interposed between the rims and constitutes the inner walls of the curved grooves or seats of the upper support. The upper support is provided at the centers of the grooves or seats with downwardly tapered depressions 9, which are seated upon and secured by bolts 10 to a horizontal supporting arm 11 of an upper bracket. The upper bracket consists of the said horizontal arm 11 and an inclined upwardly extending arm 12 having an approximately U-shaped attaching portion 13 formed by bending the metal of the inclined arm on itself and looped over and secured by bolts 14 to the side 15 of a car, as clearly illustrated in Fig. 2 of the drawings. The horizontal supporting arm 11 is channeled and consists of a horizontal top portion and depending side flanges, and the groove or channel of the arm 11 receives the heads of the bolts 10 while the nuts thereof are arranged in the depressions 9 of the upper support. The upper support is also provided at opposite sides of the center with depressions 16, receiving cushions 17 of rubber or other suitable material, projecting above the upper faces of the bottoms of the grooves or seats of the upper support and receiving and supporting the rims and adapted to prevent the same from being injured by the vibrations incident to an automobile.

The lower support 2, which is also constructed of pressed steel or other suitable material, is curved longitudinally to present an upper concave face to the tires and is bent transversely to form longitudinal grooves 18, which constitute seats for the tires 5, and the grooved portions of the bottom support are curved transversely to fit against and conform to the configuration of the treads of the tires 5. Instead, however, of constructing the upper and lower supports of pressed steel, they may be made of any other suitable material, as will be readily understood. The lower support is provided with a central longitudinally disposed raised portion 19, approximately inverted U-shaped in cross section and spacing the grooves or seats from each other. The raised portion constitutes an intervening connecting web between the seats 18 for the tires. The lower support, which is also preferably tapered at its ends, is provided at opposite sides of the center with depressions 20, arranged in pairs and seated upon horizontal arms 21 of a pair of lower supporting brackets, constructed of channeled metal and consisting of the said horizontal arms 21 and upwardly extending inclined arms 22, provided at their upper ends with approximately L-shaped terminal attaching portions 23, which conform to the configuration of and are secured by bolts 24 or other suitable fastening devices to the side beam or frame member 25 of the frame of the automobile. The depressions 20 receive the heads of bolts 26, which pierce the lower supports and the channeled brackets and have their nuts arranged in the grooves or channels thereof beyond the plane of the seats. The horizontal supporting and inclined arms 21 and 22 of the lower brackets are composed of side flanges and connecting portions similar to the supporting arm 11 of the upper bracket. By securing the upper and lower brackets to a car at different distances apart, the support is adjustable to receive rims and tires of different diameters.

The upper and lower supports are adapted to hold demountable rims equipped with pneumatic or any other construction of tire, and they may also be employed for supporting any form of tire without a rim. The upper support, which extends beneath the underside of the demountable rim, is adapted to support the tire and relieve the bottom portion thereof of undue pressure, which might injuriously affect the rubber of the tire.

The demountable rims and the tires are detachably confined in the seats of the upper and lower supports by the yoke 3, composed of a horizontal top portion and depending sides diverging downwardly and fitted in and supported in sockets or recesses 28 of the lower support. The yoke 27 is preferably constructed of channeled metal and is composed of spaced side flanges and a connecting portion forming a groove or channel at the lower face of the top portion of the yoke and the inner faces of the depending side portions thereof. The sockets or recesses 28, which have horizontal portions and upwardly extending walls at the outer sides and ends, are pressed or otherwise formed at the centers of the outer walls of the grooves or seats of the lower support, and when the sides of the yoke are fitted in the sockets, they are held against movement laterally or longitudinally of the lower support. The sockets, however, may be formed in any other desired manner, and they project laterally beyond the planes of the tire receiving grooves or seats. The yoke is equipped at the center with a depending tubular stem 29, which forms a lock casing or chamber and is provided at its upper end with an annular attaching flange 30, which is riveted or otherwise secured to the top portion of the yoke in the groove or channel thereof. The depending tubular stem extends through a central circular opening 31 in a slightly depressed horizontal portion 32 of the longitudinal raised portion 19. The lower support is provided at one side of the circular opening 31 with a notch or recess 33, forming a passage for an engaging portion or bolt 34 of locking mechanism 35, mounted within and carried by the tubular stem 29, which is provided at the lower portion with a horizontal slot 36 to permit the engaging portion 34 to be oscillated or partially rotated to be carried to and from the notch or recess 33. Any suitable key controlled locking mechanism may be employed for this purpose, and as the specific construction of the locking mechanism does not constitute a portion of the present invention, specific description and illustration thereof are deemed unnecessary. When the yoke is placed in position on the lower support with its sides in the recesses or sockets 28, the lower end of the tubular stem extends through the opening 31, and the engaging portion 34 of the locking mechanism is located beneath the plane of the horizontally depressed portion 32, and when the engaging member 34 is carried away from and out of alinement with the notch or recess 33, it engages the lower face of the depressed portion 31 and retains the yoke in position on the lower support. The yoke will then confine the rims and the tires on the upper and lower supports, and it will be impossible to remove them therefrom without first unlocking and removing the yoke by the use of its proper key.

The upper and lower supports are reversely curved and their corresponding grooves or seats are arranged in the same vertical planes, so that the rims and the tires are supported in a vertical position.

The yoke is provided at the center with a suitable key hole 37, and it has a pivot plate or cover 38 for protecting the key hole. The cover 38 is pivoted at one end by a rivet 39, or other suitable fastening device, and it is provided at the other end with a protuberance 40 formed by indenting the upper face of the cover and projecting from the lower face thereof and adapted to engage an indentation 41 of the yoke, whereby the cover is retained in its closed position.

The lower support is preferably provided at the centers of the tire receiving grooves or seats with drain openings 42 to allow any moisture accumulating in the lower support to drain therefrom.

The present application is a species of the generic invention of an application, filed Mar. 26, 1912, Serial No. 686,456, the claims of which are sufficiently broad to cover the lower support of the present invention.

What is claimed is:—

1. A device of the class described comprising a support provided with spaced concave tire-receiving seats and having an intervening connecting web or portion and provided at the outer walls of the seats with sockets, and a yoke arching the said seats and having its terminal portions engaging said sockets and supported by the said outer walls, said yoke being provided between its ends with a depending tubular stem extending from the yoke through the web or connecting portion of the support, said stem having contained within the same locking mechanism for holding the stem to the support.

2. A device of the class described including a support having spaced concave tire-receiving seats and provided between the same with a connecting web or portion having an opening, a yoke arching the support and having its terminal portions supported by the outer walls of the same, said yoke being provided between its ends with a depending tubular stem extending at its lower end through the opening in the support and located between the said seats, and locking mechanism contained within the tubular stem and having means for engaging the lower face of the support for retaining the yoke in place.

3. A device of the class described, including a support having a groove or seat to receive a tire and extending circumferentially around a portion of the same and having its groove or seat curved lengthwise of the tire and fitting the latter, brackets arranged at spaced points along the support and having supporting portions extending beneath the said support and secured to the same at the bottom of the groove or seat, and a yoke arching the support at a point between the brackets and detachably secured to the support and removable therefrom.

4. A device of the class described including a supporting bracket constructed of a channeled material and composed of a horizontal supporting arm and an upwardly extending arm having a terminal attaching portion, a support provided with a groove or seat and secured to the bracket, and a yoke arching the support and detachably secured to the same.

5. A device of the class described including a projecting bracket, a support constructed of sheet metal and bent transversely to provide a tire receiving seat and provided at the bottom thereof with a depressed portion arranged upon the said bracket, and a fastening device piercing the said depression and the bracket and located within the said depression beyond the plane of the seat.

6. A device of the class described including a suporting bracket having a channeled arm, a support constructed of pressed material and provided with a plurality of parallel seats and having depending depressed portions arranged upon the said bracket, and fastening devices piercing the depressed portions and the bracket and having their terminals arranged within the said depressed portions and the channel of the bracket.

7. A rim and tire holder including a top support curved longitudinally of a tire or rim to present an upper convex surface to the same and provided with spaced parallel grooves forming tire-receiving seats and having an intervening integral arched longitudinal rib arranged to space a pair of tires and constituting the inner walls of said seats, a bracket having a horizontal arm, and bolts connecting said arm to the said seats, the latter being provided with depressions at the points where the bolts connect.

8. A device of the class described including a support constructed of compressed sheet metal and extending around a portion of the tire and curved longitudinally in a direction circumferentially of the tire and bent transversely to form parallel grooves or seats in the upper face of the support, the latter being provided with an upwardly extending longitudinal portion approximately inverted U-shaped in cross section, which spaces the grooves or seats, and a yoke arching the grooves or seats and having a stem located at an intermediate point and detachably connected with the upwardly extended longitudinal portion of the support.

9. A device of the class described including an upper support curved longitudinally to present an upper convex surface to the underside of the top portion of the tire and having a longitudinal groove or seat for the same, a lower support curved longitudinally to present an upper concave surface to the bottom portion of the tire and provided with a longitudinal groove or seat for the same, said grooves or seats being adapted to receive a tire or rim, and locking means carried by one of the supports and arranged to retain a tire or rim in the said grooves or seats.

10. A device of the class described including an upper support curved longitudinally to present an upper convex surface to the underside of the top portion of a tire and provided with longitudinal grooves or seats for the same, a lower support curved longitudinally to present an upper concave surface to the bottom portion of the tire and provided with longitudinal grooves or seats for the same, and a yoke arching one of the supports and provided between its ends with locking mechanism adapted to engage such support between the grooves or seats thereof.

11. A device of the class described including a lower support having a concave seat adapted to receive the bottom portion of the tire of a demountable rim, an upper support having a recess or seat and adapted to extend beneath the underside of the top portion of a demountable rim for supporting the same and the tire thereof at the top to relieve the bottom of the tire of the weight thereof, and separate means for mounting the upper and lower supports upon a vehicle.

12. A device of the class described adapted to receive a pair of tires or rims and including a top support curved circumferentially of the tires or rims and extending beneath and engaging the underside of the top portions of the said tires or rims and presenting an upper convex surface to the same, said top support having spaced parallel grooves forming tire receiving seats, and a bracket having an arm extending beneath the top support and secured to the same.

13. A device of the class described adapted to receive a pair of tires or rims and including a top support curved circumferentially of the said tires or rims and engaging beneath the underside of the top portions of the same and presenting a convex upper surface to the said tires or rims, said top support having parallel grooves forming tire receiving seats, a lower support curved circumferentially and presenting an upper concave surface to the bottom portions of the said tires or rims and having parallel grooves forming tire receiving seats, and clamping means arching the lower support and arranged to engage the upper sides of the bottom portions of the tires or rims and retaining the same in the seats of the said supports.

14. A device of the class described adapted to receive a pair of tires or rims and including a bracket having a horizontal arm provided with spaced bolts, and a top support curved circumferentially and having spaced tire receiving seats and presenting an upper convex surface to and engaging the undersides of the top portions of the tires or rims, said top support being provided with openings for the said bolts and adapted to support the tires or rims side by side.

In testimony, that I claim the foregoing as my own, I have hereto affixed my signature in the presence of two witnesses.

FRANKLIN C. MILLER.

Witnesses:
THOMAS T. MILLER,
JOHN H. BAKER.